United States Patent [19]

Schöneborn

[11] 3,746,288

[45] July 17, 1973

[54] SYSTEM FOR THE RADIO TRANSMISSION OF GUIDANCE SIGNALS TO SELF-PROPELLED BODIES

[75] Inventor: Hellmuth Schöneborn, Sauerlach, Oberbayern, Germany

[73] Assignee: Bolkow Gesellschaft mit beschrankter Haftung, Munich, Germany

[22] Filed: Aug. 2, 1962

[21] Appl. No.: 214,425

[30] Foreign Application Priority Data

July 17, 1962 Germany .......... B 63852

[52] U.S. Cl. .......... 244/3.14

[51] Int. Cl. ...... F41g 7/00, F41g 11/00, G05d 1/00

[58] Field of Search .......... 244/18, 14, 14.5, 244/3.14; 102/50

[56] References Cited

UNITED STATES PATENTS

| | | | |
|---|---|---|---|
| 2,939,020 | 5/1960 | Hodson et al. | 244/14 X |
| 2,944,763 | 7/1960 | Grandgent et al. | 89/1.7 B |
| 3,060,425 | 10/1960 | Cutler | 244/14 A |
| 3,093,824 | 6/1963 | Ammerman | 343/100.3 |

FOREIGN PATENTS OR APPLICATIONS

| | | | |
|---|---|---|---|
| 134,842 | 3/1953 | Australia | 244/14.5 |

*Primary Examiner*—Benjamin A. Borchelt
*Assistant Examiner*—Thomas H. Webb
*Attorney*—McGlew and Toren

EXEMPLARY CLAIM

1. In a system for the radio transmission of guidance signals to a self-propelled body, in combination at least one control center, provided with two transmitters continuously transmitting two different carrier frequencies, a pulse stage connected to simultaneously modulate both transmitters, adjusting means at each control center for frequency modulating both said transmitters with independent frequencies, said adjusting means comprising a hand-operated control stick operable in accordance with the observed deviations of said body to be guided from the line of sight to its target, two filters connecting said transmitters to a single circularly polarizing wideband transmitting antenna both for transmitting the modulated carrier frequencies to the self-propelled body, said body having a dipole antenna, connected with a mixing circuit with nonlinear characteristic to form an intermediate frequency from the two carrier frequencies received, an intermediate-frequency amplifier tuned to said intermediate-frequency, a demodulator with a frequency selector connected for obtaining and separating the modulation frequencies, one amplifier and one discriminator for each modulation frequency for determining the guidance signals represented by the modulation frequencies.

3 Claims, 3 Drawing Figures

INVENTOR

Hellmuth Schöneborn

By Watson, Cole, Grindle & Watson

ATTORNEY

INVENTOR
Hellmuth Schöneborn
By Watson, Cole, Grindle & Watson
ATTORNEY

SYSTEM FOR THE RADIO TRANSMISSION OF GUIDANCE SIGNALS TO SELF-PROPELLED BODIES

This invention relates to a method and apparatus for the radio transmission of guidance signals to self-propelled bodies, i.e., for instance guided missiles. When transmitting guidance signals to a body to be guided and when said guidance signals are produced by a control center in conformity with the observed deviation of said body from the path to its target, it will be necessary to make the recognition of the used guidance system difficult for an enemy and to prevent any jamming of said system.

For this purpose well focusing directional antennas are used on the transmitter base as well as on the receiving station, the transmission power is chosen as high as possible, while the sensitivity of the receiver is kept as low as possible, and all dispensable messages, which might facilitate the enemy's evaluation work, are supressed in the guidance signal. Furthermore, it is known that the guidance signals to be transmitted are coded.

Experience has shown, however, that the known measures are not sufficient to prevent countermeasures by the enemy and that it is generally possible for an enemy to find out the code used.

It is an object of the present invention to provide a method for transmitting guidance signals which can hardly be jammed by an enemy. With the above object in view, the present invention consists of two simultaneously pulsed carrier frequencies which are transmitted from the control center and the difference of which is the intermediate frequency of the receiver of the missile to be guided. Moreover, each carrier frequency is modulated with a modulation frequency each being variable through adjusting means in accordance with the guidance signals to be transmitted. The modulated carrier frequencies are fed through filters to a circularly polarizing wide-band transmitting antenna, and by means of this antenna said modulated carrier frequencies are transmitted to the body to be guided. In order to form the intermediate frequency on the guided missile the received carrier frequencies are mixed with one another, the intermediate frequency is then amplified, and the original modulation frequencies are obtained by demodulation, said original modulation frequencies being further amplified in separate channels, being limited, and finally converted to guidance signals by frequency discriminators.

To avoid that the guidance-signal receiver be jammed in the interval between the pulsewise transmitted guidance signals, said receiver of the body to be guided is blocked after reception of a guidance signal pulse until shortly before receiving the next guidance signal pulse.

For this purpose said receiver is provided with a time-dependent blocking member which blocks the receiver in conformity with the pulse-repetition frequency of the control center.

According to another embodiment of the invention a common pulse generator is provided when several control centers shall operate simultaneously. Said pulses, which are simultaneously fed to all control centers, are delayed in each control center by another amount and hence the transmission pulses of neighboring control centers, never occur simultaneously.

The time-dependent blocking member of each receiver of the different missiles has been designed in such a way that, released by the first control signal of its coordinated control center at launching, it blocks the receiver of the body to be guided until shortly before and after receiving the guidance signal pulse.

In order to start efficient electronic countermeasures an enemy would therefore have to determine the moments of the pulse transmission, the pulse-repetition frequency of each control center, the duration of the pulse of a guidance-signal transmission, the plane of polarization of the guidance signals, two simultaneously pulsed carrier frequencies and two modulation frequencies. Since the transmitters polarize circularly, a pronounced plane of polarization cannot be detected by the enemy, but he must detect the sense of rotation of the polarizing waves. Moreover, it has to be considered that only a maximum time of 5 to 10 seconds is available for guiding a self-propelled body, and hence it will be nearly impossible to determine the above-mentioned data and to start efficient countermeasures within the time of guidance.

The details of the invention will be best understood from the following description in connection with the accompanying drawing in which.

Figure 1:
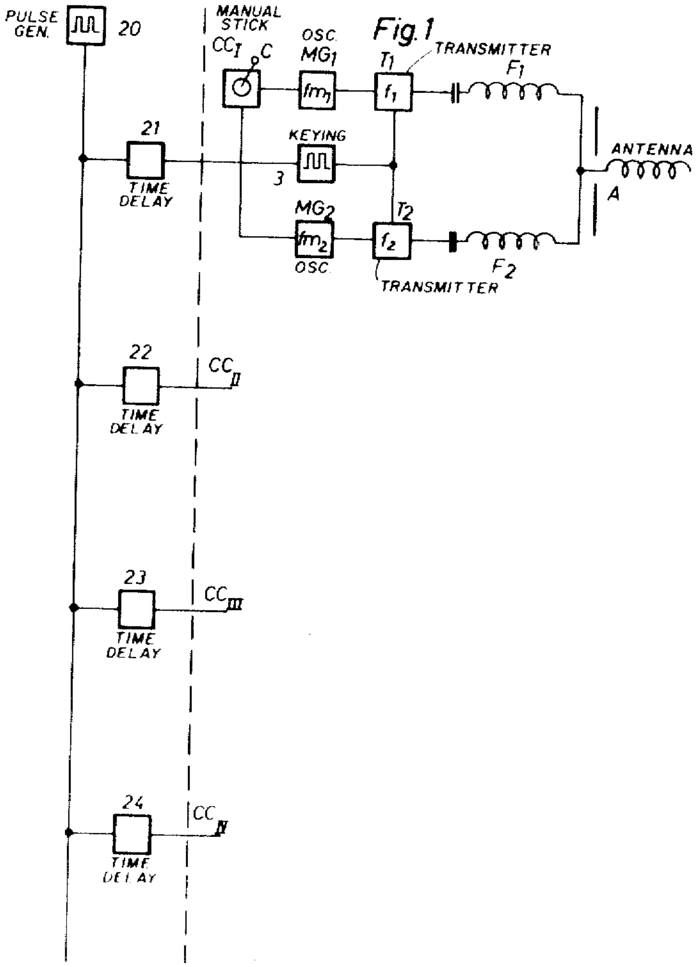
FIG. 1 is a block diagram of a control center for the production of guided signals in accordance with the present invention.

To give a easier understanding of the invention it is only one control center, as control center $CC_l$, shown in FIG. 1.

To guide a self-propelled body in two axes — vertical axis and lateral axis — two messages are necessary which are produced in separate channels of the control center and which will be marked by subscripts 1 and 2.

Each control center has two transmitters $T_1$ and $T_2$ which are controlled by pulse stage 3. $T_1$ produces a first carrier frequency $f_1$, while $T_2$ produces a second carrier frequency $f_2$. Moreover, modulation frequency $fm_1$ is produced in generator $MG_1$, and modulation frequency $fm_2$ is produced in generator $MG_2$.

These modulation frequencies are variable, for instance by means of a hand-operated control stick C, this variation depending on the observed lateral and vertical deviations of the body to be guided from the line of sight to its target.

Carrier frequency $f_1$ modulated by modulation frequency $fm_1$ and carrier frequency $f_2$ modulated by modulation frequency $fm_2$ are fed to a circularly polarizing wide-band transmitting antenna A through filters $F_1$ and $F_2$, respectively. This transmitting antenna A is directed to the body to be guided and transmits the simultaneously pulsed frequencies $f_1$ and $f_2$ to said body.

Figures 1, 2:
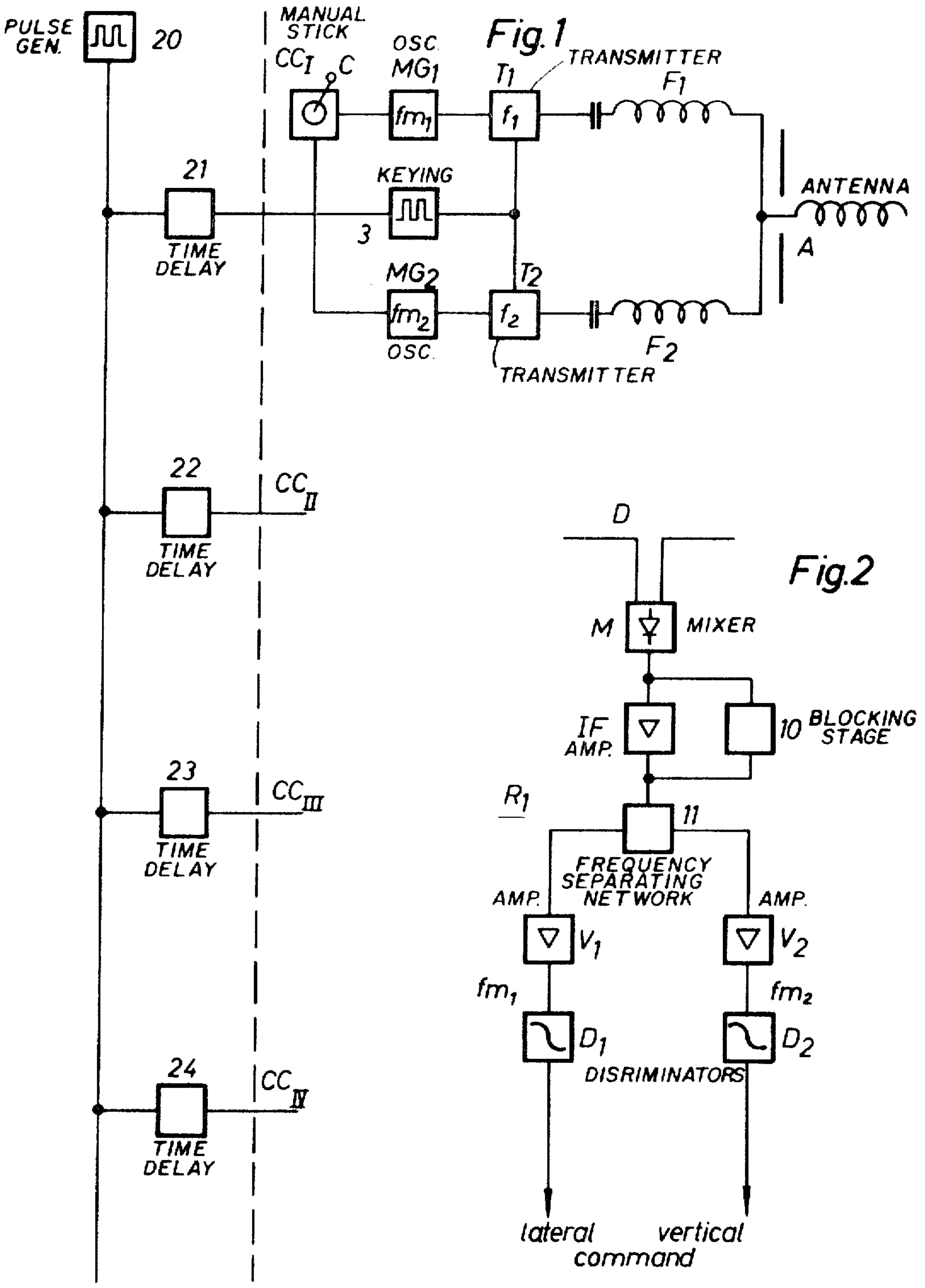
FIG. 2 is a block diagram of a receiver for the evaluation of guidance signals in accordance with the invention.

The body to be guided has a receiver $R_l$ (see FIG. 2) consisting of dipole antenna D connected to mixing circuit M. Said mixing circuit M has a curved characteristic and consists for instance of a diode, a regenerative rectifier or the like.

The modulated frequencies $f_1$ and $f_2$ received by the dipole are combined by the mixing stage to form the intermediate frequency of the receiver to which the following intermediate frequency amplifier IF is tuned.

After corresponding amplification and demodulation the modulation frequencies $fm_1$ and $fm_2$ are obtained, and they are separated by a frequency selector. In the drawing said amplfication stage, said demodulation stage and said frequency selector are shown by block 11.

The modulation frequencies are evaluated in separate channels being marked again by subscripts 1 and 2 in conformity with the control center $CC_I$.

The lateral command is obtained from modulation frequency $fm_1$ after the respective amplification and limitation, while the vertical command is obtained from modulation frequency $fm_2$ after the respective amplification and limitation. For this purpose each channel has an amplification stage $V_1$ and $V_2$, respectively, as well as a frequency discriminator $D_1$ and $D_2$, respectively.

To avoid that the receiver be interfered by a jamming station during the time between the reception of the pulsewise transmitted guidance signals, said receiver is blocked, for instance, by a unit 10. Said unit is a time-dependent blocking member, which produces blocking pulses depending on the pulse-repetition frequency of the control center. Said blocking pulses block the receiver of the missile during the transmission intermission. In other words: after the first pulse said blocking member always opens the receiver of the body to be guided after the same blocking times during the whole guiding process. A monostable multivibrator, for instance, can be used as blocking member.

In order to allow the simultaneous operation of several control centers, a common pulse generator 20 (FIG. 1) has been provided for all control centers. Said synchronization pulse generator 20 is connected to control center $CC_I$ through delay stage 21, to control center $CC_{II}$ through delay stage 22, to control center $CC_{III}$ through delay stage 23, to control center $CC_{IV}$ through delay stage 24 and so on. To give better survey the control centers $CC_{II}$ to $CC_{IV}$ are not shown in FIG. 1.

The delay stages control pulse modulation stages 3 of the neighboring control centers successively at a given delay time so that the control pulses of neighboring control centers can never be produced nor transmitted simultaneously. In this way a time multiplex is obtained.

Figure 3:
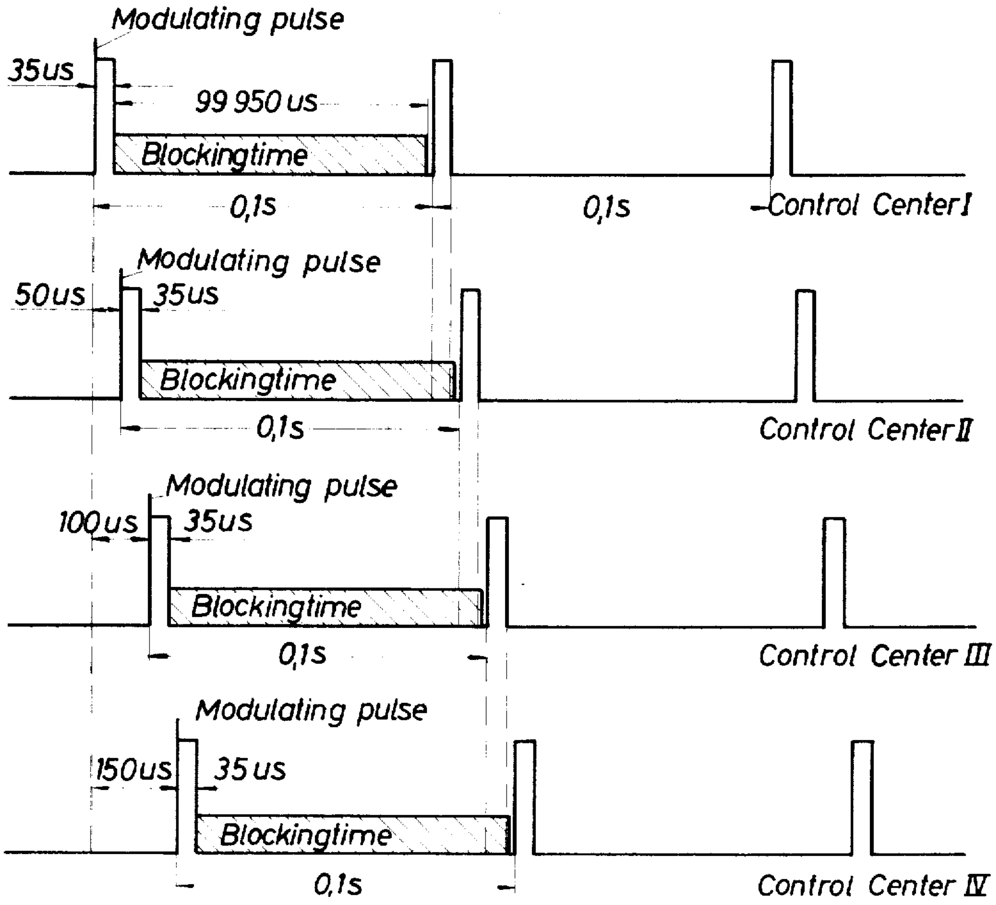
FIG. 3 is a pulse diagram for a number of control centers with the blocking times of the receivers.

An example for the modulation frequencies $fm_1$ and $fm_2$ to be used as well as for the duration and sequence of pulses, which can be applied, is given in FIG. 3. In detail FIG. 3 shows the sequence of the transmitting pulses of the control centers $CC_I$, $CC_{II}$, $CC_{III}$, $CC_{IV}$ as well as the blocking times of the corresponding receivers of the bodies to be guided.

If a frequency of 300 kc. p.s. is assumed as the lower of the two modulation frequencies and provided that each guidance pulse shall receive at least 10 cycles of the modulation frequency, there result about 35 usec for the duration of a high-frequency guidance pulse to be transmitted.

If the transmitting pulses of neighboring control centers are shifted by 50 usec each for safety reasons, which is done by means of delay stages 21, 22, 23, 24 etc. (FIG. 1), about 2,000 control centers can be operated in this way without interference, if the pulse-repetition is 10 cps.

The provision of different transmitting frequencies for each control center is therefore unnecessary. Hence the blocking time of each receiver (FIG. 2) of this unit has the amount of 0.1 sec minus 50 usec = 99.950 usec.

Moreover, one has to consider that independent of its operating time a starting pulse for a body to be guided can become effective only when the control centers $CC_I$, $CC_{II}$, $CC_{III}$, $CC_{IV}$ etc. are unlocked through the respective delay stages 21, 22, 23, 24 etc. as shown in FIG. 3. We thus obtain the synchronization of the individual control centers with the coorinate bodies to be guided.

What is claimed as new and desired to be secured by Letters Patent is:

1. In a system for the radio transmission of guidance signals to a self-propelled body, in combination at least one control center, provided with two transmitters continuously transmitting two different carrier frequencies, a pulse stage connected to simultaneously modulate both transmitters, adjusting means at each control center for frequency modulating both said transmitters with independent frequencies, said adjusting means comprising a hand-operated control stick operable in accordance with the observed deviations of said body to be guided from the line of sight to its target, two filters connecting said transmitters to a single circularly polarizing wide-band transmitting antenna both for transmitting the modulated carrier frequencies to the self-propelled body, said body having a dipole antenna, connected with a mixing circuit with nonlinear characteristic to form an intermediate frequency from the two carrier frequencies received, an intermediate-frequency amplifier tuned to said intermediate-frequency, a demodulator with a frequency selector connected for obtaining and separating the modulation frequencies, one amplifier and one discriminator for each modulation frequency for determining the guidance signals represented by the modulation frequencies.

2. In a system for the radio transmission of guidance signals to self-propelled bodies, in combination several control centers, said control centers having transmitter means for producing two carrier frequencies each of predetermined frequency spacing, adjusting means for producing a modulation frequency for each of said carrier frequencies, the frequencies of said modulation frequencies being variable independently of each other through said adjusting means according to the guidance signals to be transmitted, a generator for producing synchronizing pulses, time delay stages coordinated with each control center, said delay stages being all connected to the aforementioned generator and unlocking the individual control centers successively in the rhythm of the delay synchronizing pulses so that the transmitting pulses of neighboring control centers never occur simultaneously in the case of an equal pulse-repetition frequency of the synchronizing pulses, filters and wide-band antennas coordinated with and connected to each control center, in order to transmit the modulated carrier frequencies to the self-propelled bodies, said bodies having one antenna each connected with a mixing stage for receiving the modulated carrier frequencies to form the intermediate frequency corresponding to the above-mentioned spacing of the carrier frequencies, an intermediate-frequency amplifier tuned to the intermediate frequency a demodulator with a frequency selector connected for obtaining and separating the aforementioned modulation frequencies and one amplifier and frequency discriminator each, in order to obtain the guidance signals from said modulation frequencies, said guidance signals being given in the respective control center.

3. In a system for the radio transmission of guidance signals to self-propelled bodies, in combination several control centers, said centers having transmitter means producing two pulsed carrier frequencies of predetermined frequency spacing, adjusting means for producing a modulation frequency for each of said carrier frequencies, said modulation frequencies being variable independently of each other through said adjusting means according to the guidance signals to be transmitted , a generator for producing synchronizing pulses, time delay stages coordinated with each control center, said delay stages being all connected to the aforementioned generator and unlocking the individual control centers successively in the rhythm of the delayed synchronizing pulses so that the transmitting pulses of neighboring control centers never occur simultaneously in the case of an equal pulse-repetition frequency of the synchronizing pulses, filters and wideband antennas coordinated with and connected to each control center, in order to transmit the modulated carrier frequencies to the self-propelled bodies, said bodies having one antenna each connected with a mixing stage for receiving the modulated carrier frequencies to form the intermediate frequencies corresponding to the above-mentioned frequency spacing, an intermediate frequency amplifier, a demodulator with a frequency selector connected for obtaining and separating the aforementioned two modulation frequencies, one amplifier and discriminator each, in order to obtain the guidance signals from said modulation frequencies, said guidance signals being given in the respective control center, as well as further means arranged in each body for producing blocking pulses for the receiver in accordance with the pulse-repetition frequency of the transmitter until shortly before and after the pulse transmission.

* * * * *

UNITED STATES PATENT OFFICE

CERTIFICATE OF CORRECTION

Patent No. 3,746,288 Dated July 17, 1973

Inventor(s) Hellmuth Schöneborn

It is certified that error appears in the above-identified patent and that said Letters Patent are hereby corrected as shown below:

On the cover sheet [30] "July 17, 1962" should read -- August 31, 1961 --.

Signed and sealed this 1st day of October 1974.

(SEAL)
Attest:

McCOY M. GIBSON JR.
Attesting Officer

C. MARSHALL DANN
Commissioner of Patents